E. C. OLIVER.
TIME CONTROLLED MECHANISM.
APPLICATION FILED NOV. 18, 1912.

1,162,390.

Patented Nov. 30, 1915.

WITNESSES:
Robert N. Van Buskirk
Virginia C. Spratt

INVENTOR
Edd C. Oliver
BY Ralgemond H Parker
ATTORNEY

UNITED STATES PATENT OFFICE.

EDD C. OLIVER, OF DETROIT, MICHIGAN.

TIME-CONTROLLED MECHANISM.

1,162,390.

Specification of Letters Patent. Patented Nov. 30, 1915.

Application filed November 18, 1912. Serial No. 731,918.

*To all whom it may concern:*

Be it known that I, EDD C. OLIVER, a citizen of the United States, residing at Detroit, county of Wayne, State of Michigan, have invented a certain new and useful Improvement in Time-Controlled Mechanism, and declare the following to be a full, clear, and exact description of the same, such as will enable others skilled in the art to which it pertains to make and use the same, reference being had to the accompanying drawings, which form a part of this specification.

Figure 2:
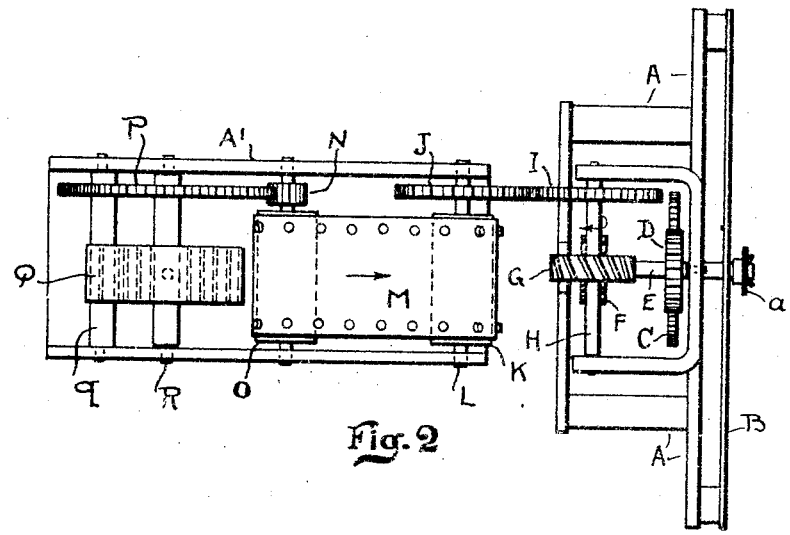
Figure 1:
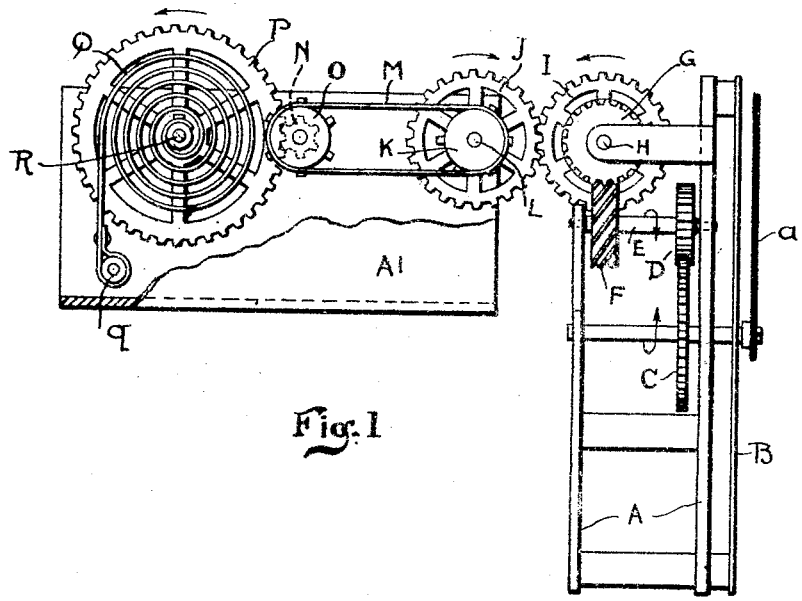

My invention relates to time controlled mechanism and the object of my improvements is to provide for controlling by a clock mechanism the rate of travel of a mechanism impelled by an independent motor. I secure this object in the device illustrated in the accompanying drawings, in which, Figure 1, is a side elevation of a mechanism embodying my invention. Fig. 2, is a plan view of the same.

A, is a frame of the clock mechanism, and B, is the face plate over which turns the hand $a$.

C, is the hour wheel.

D, is a wheel of less diameter than the wheel C and engaging the latter.

E, is a shaft upon which is secured the wheel D.

F, is a helical gear wheel upon the shaft E.

H, is a shaft resting in bearings in the frame A and extending at right angles to the shaft E above the same.

G, is a helical gear wheel on the shaft H, its teeth engaging the teeth of the gear wheel F.

I, is a gear wheel upon the shaft H.

$A^1$, is a frame work in which is mounted a mechanism driven by an independent motor, in this case, a spiral spring Q.

While I contemplate that my improved device shall be used in a large variety of applications to which it is adapted, I have for convenience shown it in connection with a recording apparatus, the essential parts of which are shown mounted in the frame $A^1$.

K, is a drum mounted in the frame work $A^1$, and O, is a second drum mounted parallel to the drum K in said frame. Each of the drums have at their ends a series of teeth, and there is a band M passing over the drums K and O and engaging said teeth. The band M may be adapted to receive a time record.

L, is the shaft upon which the drum K is mounted.

J, is a gear wheel upon the shaft L. The teeth of the gear wheel J engage the teeth of the gear wheel I.

R, is a shaft mounted in bearings in the frame $A^1$ parallel to the drums K and O.

P, is a gear wheel upon the shaft R.

N, is a gear wheel upon the same shaft as the drum O, the teeth of the gear wheel P engage those of the gear wheel N. The spiral spring is secured at one end to the frame $q$ and at the other end to the shaft R and is adapted to rotate said shaft to drive the drums O and L in the direction of the arrow, which carries the wheel J in the same direction as the clock mechanism tends to turn the wheel I so that the wheels J and I move together, the one impelled by the spring of the clock (not shown) and the other by the spring Q. By employing the helical gear wheels G and F, I am able to exactly graduate the force conveyed through said gear wheels, because I can make the teeth of said gear wheels at any angle and still have the proper relative angular speed of the two, therefore, I adjust the angle of these teeth so that the spring Q adds nothing or but little to the force tending to move the clock and as the clock permits the movement of the mechanism no substantial work is put upon the clock because of its controlling the independently actuated mechanism.

In mechanism of this sort there has been a recognized defect, either the clock would be retarded and therefore its proper operation prevented or else there would be force added to the clock which would result in swinging the balance wheel gradually to a greater travel than it was designed for and, consequently, one of the parts would be injured or broken and the clock would stop.

The helical gears permit a definite relative motion while preventing the transfer of power.

What I claim is:—

1. The combination of a clock mechanism, an independently driven mechanism having a yielding driving means, said mechanisms being connected so as to have uniform proportional velocities, the connecting means including a pair of helical gears, substantially as and for the purpose described.

2. The combination of a clock mechanism, an independently driven mechanism having a yielding driving means, said mechanisms being connected so as to have uniform proportional velocities by a pair of gears adapted to permit a definite relative motion while preventing the transfer of power between said clock mechanism and independently actuating mechanism, substantially as and for the purpose described.

In testimony whereof, I sign this specification in the presence of two witnesses.

EDD C. OLIVER.

Witnesses:
 AGNES M. HIPKINS,
 ELLIOTT J. STODDARD.